No. 712,699. Patented Nov. 4, 1902.
C. MAY.
MEANS FOR ASCERTAINING THE LEVEL OF LIQUIDS.
(Application filed Dec. 21, 1901.)
(No Model.)
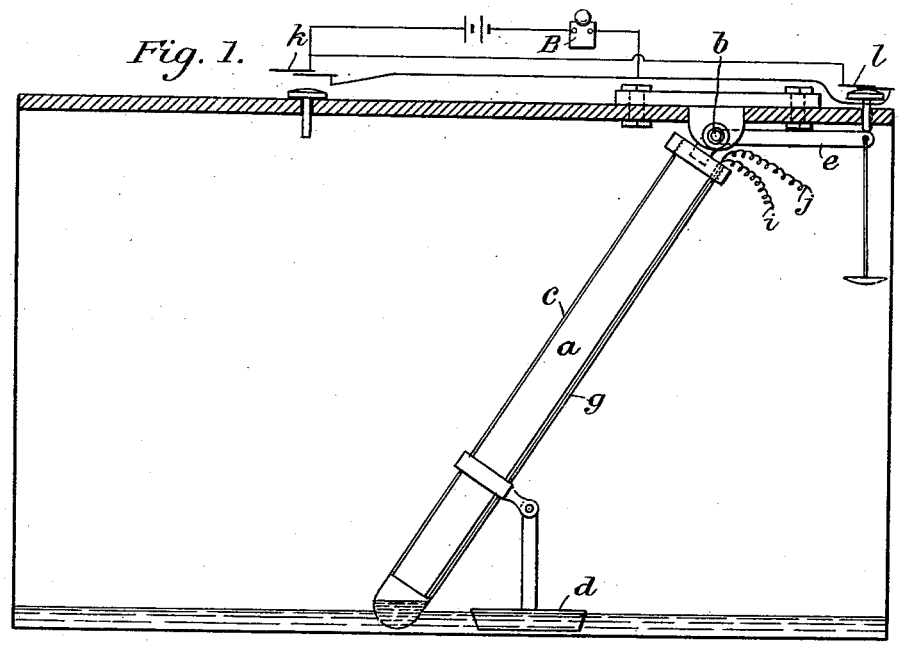
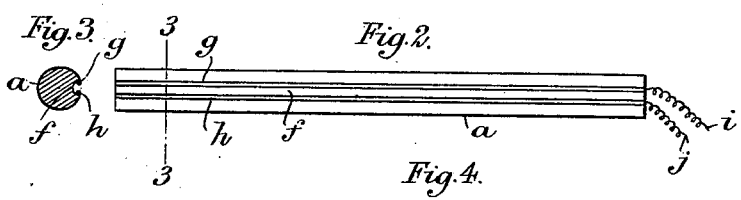
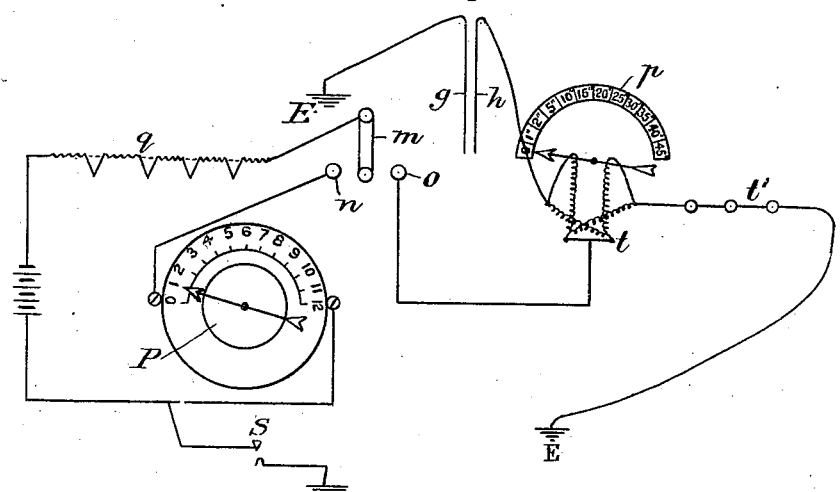
Witnesses
Inventor
Charles May,

UNITED STATES PATENT OFFICE.

CHARLES MAY, OF LONDON, ENGLAND.

MEANS FOR ASCERTAINING THE LEVEL OF LIQUIDS.

SPECIFICATION forming part of Letters Patent No. 712,699, dated November 4, 1902.

Application filed December 21, 1901. Serial No. 86,812. (No model.)

*To all whom it may concern:*

Be it known that I, CHARLES MAY, senior mechanical electrician to New Zealand Government, a subject of the King of Great Britain, residing at 53 New Broad street, in the city of London, England, have invented a certain new and useful Improved Means for Ascertaining the Level of Liquids, of which the following is a specification.

According to this invention the level of the liquid is ascertained by the varying resistance to an electric current consequent to this level. Two conductors, preferably parallel and of carbon, are immersed in the liquid and leads from them pass to a galvanometer, by which means the resistance is ascertained. As the liquid whose level it is required to ascertain is frequently foul, as in the case of bilge-water, it is preferred to attach the conductors to a pivoted rod of insulating material, which is contained in a tube within which is some water. This tube is attached to a float which rises and falls with the liquid, causing the rod to become more or less inclined, thus altering the length of the conductors that are covered by the water in the tube. Means may also be added to give an audible signal when desired.

The drawings illustrate an apparatus made in accordance with this invention.

Figure 1 shows a section of a tank containing my improvements. Fig. 2 is a plan view of part of the apparatus, and Fig. 3 is a cross-section on the line 3 3 of Fig. 2. Fig. 4 is a diagram of the circuits.

$a$ indicates a rod, of insulating material, pivoted at $b$ to the tank A and surrounded by a glass tube $c$. To the tube $c$ is pivoted a float $d$, which rises and falls with the liquid, turning the tube about its pivot $b$. To the rod $a$ is fixed an arm $e$, to which weights are attached to balance the weight of the tube and rod. In a longitudinal groove $f$ in the rod $a$ are secured two conductors $g$ and $h$, from which leads $i$ and $j$ pass to a galvanometer in the manner indicated in Fig. 4. Two contacts $k$ and $l$ may be provided, the contact $k$ being actuated by the tube $c$ when the liquid has reached the highest level and the contact $l$ when it is at the lowest level. A bell B may be provided, which rings when the circuit is closed by either contact. The two conductors are parallel and out of contact with each other, the circuit being completed by the liquid in which they are immersed. Fig. 4 shows a convenient arrangement of circuits which may be employed.

To use the apparatus, it is first ascertained by experiment what the readings of the galvanometer $p$ are when a known current is passed through the conductors for various known levels of water, and a table is made for reference. The galvanometer may be a differential one, as indicated, and of any ordinary description. If, for instance, the apparatus is used on board a ship, when the officer on the bridge wishes to know the level of water in any particular tank he tests the battery-current by moving the switch $m$ onto the contact $n$ and adjusts it, if necessary, to the reference-current by the resistance $q$. At this time the circuit will be from battery through resistance $q$, switch $m$, contact $n$, galvanometer P, back to battery. The switch $m$ is then moved onto the contact $o$ and the key S is depressed. The circuit then passes from the battery through the resistance $q$ to contact $o$ and thence to the galvanometer $p$, where the current divides, part passing through the conductors $g$ and $h$ to earth, as indicated, and the other through the resistances $t\,t'$ to earth, the current being completed through earth and the switch S, as clearly shown in Fig. 4. Inasmuch as the strength of the current varies with the level of the liquid, the level of the liquid may be readily ascertained by an inspection of the galvanometer $p$ and by reference to the tables. In practice it is convenient to use a current of the same strength, and it is for this reason that resistances $q$ are provided in the battery-circuit.

In this specification where it is said that the tube $c$ contains water I wish it to be understood that I do not wish to limit myself to water, as mercury or other suitable liquid may be used.

What I claim is—

1. Apparatus for ascertaining the level of liquids consisting of a tube containing water and pivoted at one end, two conductors held in the tube, means for passing an electric current through the conductors and means for finding the resistance to the current.

2. Apparatus for ascertaining the level of liquids consisting of a tube containing water and pivoted at one end, a rod of insulating material in the tube, two parallel conductors attached to the rod, means for passing an electric current through the conductors and means for finding the resistance to the current.

3. Apparatus for ascertaining the level of liquids consisting of a tube containing water and pivoted at one end, a rod of insulating material in the tube, two parallel carbon conductors attached to the rod, a battery and a galvanometer for indicating the resistance of the circuit to a current from the battery.

CHARLES MAY.

Witnesses:
JOHN H. WHITEHEAD,
FREDK. C. WEATHERBY.